No. 607,462. Patented July 19, 1898.
F. H. RICHARDS.
AUTOMATIC WEIGHING MACHINE.
(Application filed Aug. 23, 1897.)
(No Model.) 7 Sheets—Sheet 1.

Witnesses:
Chas. D. King
Fred. J. Dole

Inventor:
F. H. Richards

No. 607,462. Patented July 19, 1898.
F. H. RICHARDS.
AUTOMATIC WEIGHING MACHINE.
(Application filed Aug. 23, 1897.)
(No Model.) 7 Sheets—Sheet 2.

Witnesses:
Frank G. Hewitt
Fred. J. Dole

Inventor:
F. H. Richards

No. 607,462. Patented July 19, 1898.
F. H. RICHARDS.
AUTOMATIC WEIGHING MACHINE.
(Application filed Aug. 23, 1897.)

(No Model.) 7 Sheets—Sheet 3.

Witnesses:
Chas. L. King.
Fred. J. Dole.

Inventor:
F. H. Richards.

No. 607,462. Patented July 19, 1898.
F. H. RICHARDS.
AUTOMATIC WEIGHING MACHINE.
(Application filed Aug. 23, 1897.)
(No Model.) 7 Sheets—Sheet 5.

No. 607,462. Patented July 19, 1898.
F. H. RICHARDS.
AUTOMATIC WEIGHING MACHINE.
(Application filed Aug. 23, 1897.)
(No Model.) 7 Sheets—Sheet 6.

Witnesses: Chas. H. King, Fred. J. Dole.

Inventor: F. H. Richards.

THE NORRIS PETERS CO., PHOTO-LITHO., WASHINGTON, D. C.

No. 607,462. Patented July 19, 1898.
F. H. RICHARDS.
AUTOMATIC WEIGHING MACHINE.
(Application filed Aug. 23, 1897.)
(No Model.) 7 Sheets—Sheet 7.

Witnesses: Chas. D. King, Fred. J. Dole.

Inventor: F. H. Richards.

UNITED STATES PATENT OFFICE.

FRANCIS H. RICHARDS, OF HARTFORD, CONNECTICUT.

AUTOMATIC WEIGHING-MACHINE.

SPECIFICATION forming part of Letters Patent No. 607,462, dated July 19, 1898.

Application filed August 23, 1897. Serial No. 649,144. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Automatic Weighing-Machines, of which the following is a specification.

This invention relates to automatic weighing-machines of that class adapted for weighing predetermined quantities of granular or other material, and especially to improvements in overloading-machines of the type described in Letters Patent heretofore granted to me, and in which a true load is obtained by delivering an overload to a receiver and subsequently removing the surplus therefrom, the main object of the invention being to provide improved means for positively obtaining an overload in the receiver, preferably by the movement of a valve-operated resistance device in the form of an overweight normally forming part of the counterpoising portion of the weighing mechanism and shiftable off from the weighing mechanism at a predetermined point in the descent of the latter.

Another feature of the invention is the provision of improved load-reducing means in which the reduction of the overload is controlled by the load-discharger of the weighing mechanism, and in connection with the several novel mechanisms above referred to I also make use of improved regulator apparatus, which will be described more particularly hereinafter.

Figure 1:
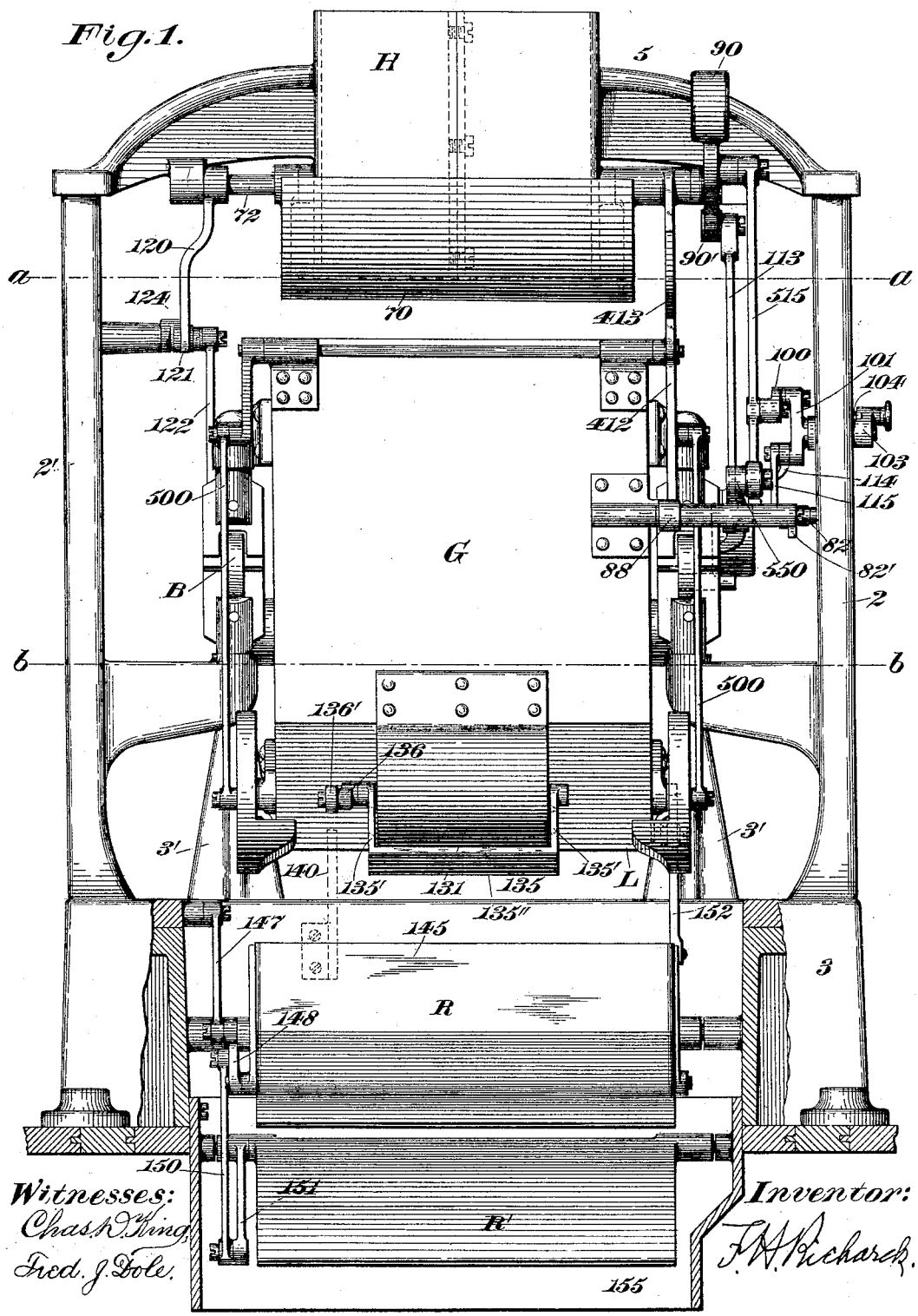
Figure 2:
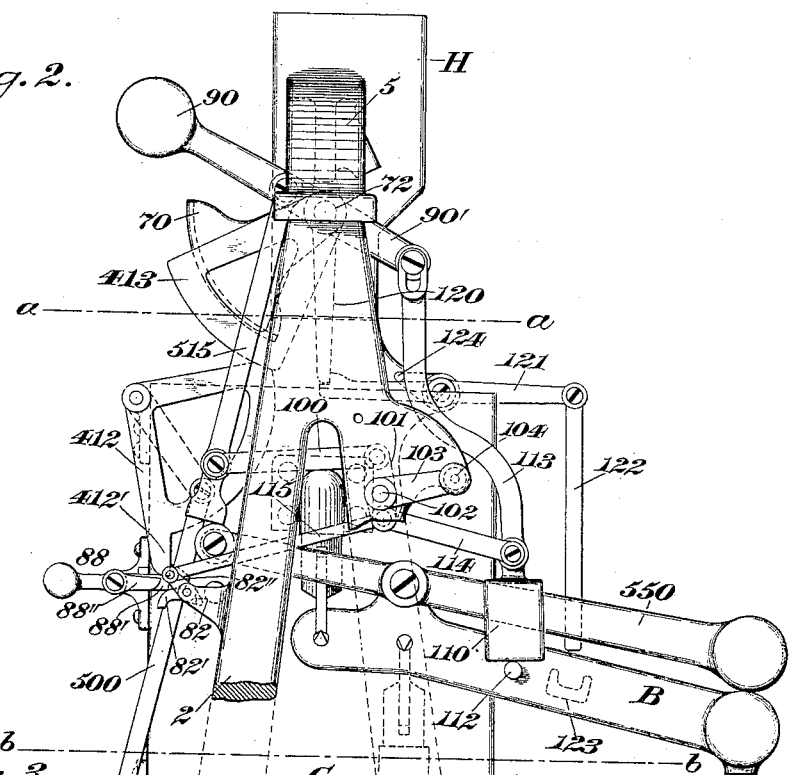
Figure 3:
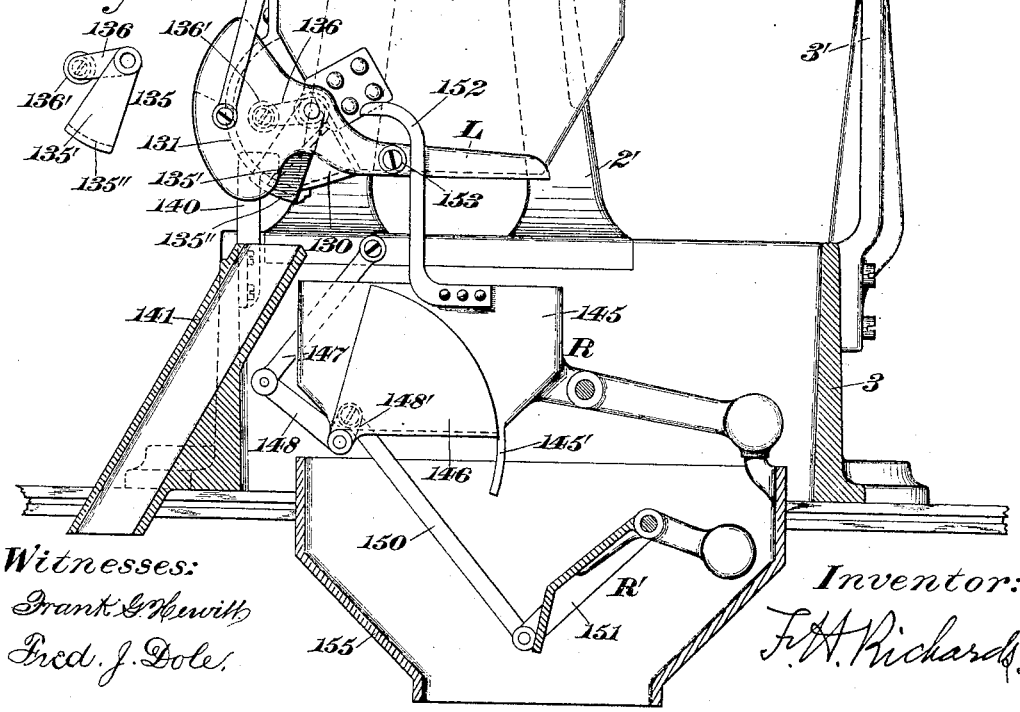
Figure 4:
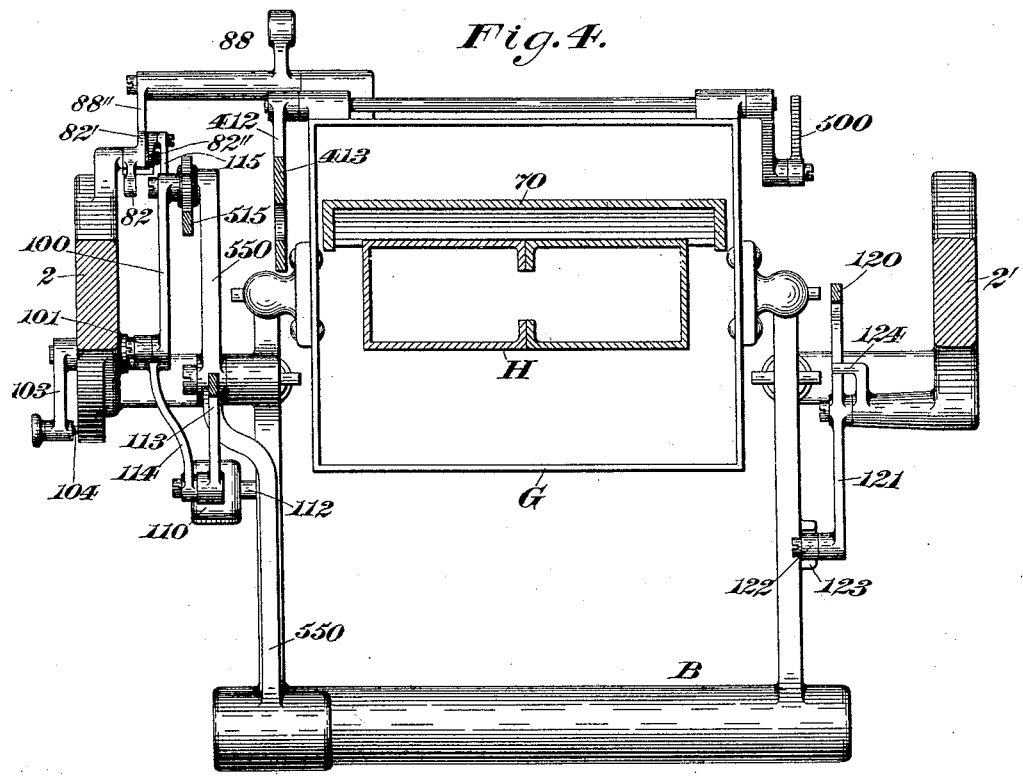
Figure 5:
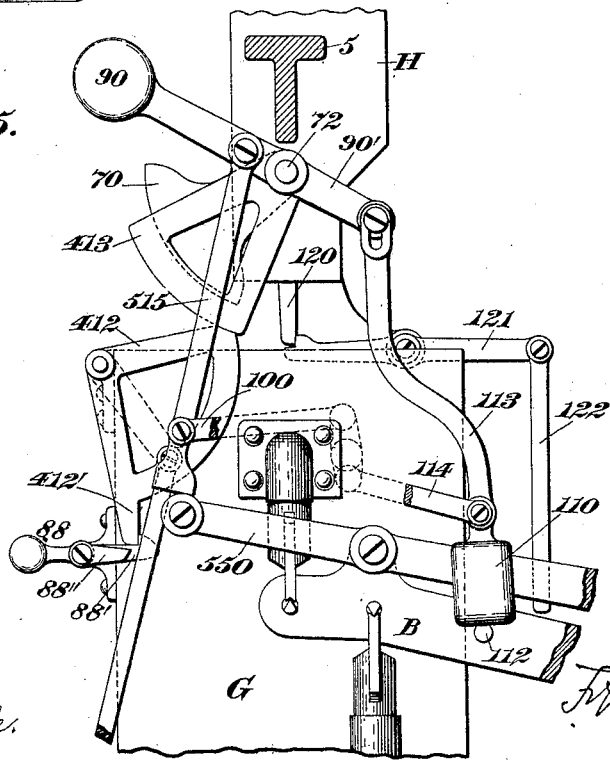
Figure 6:
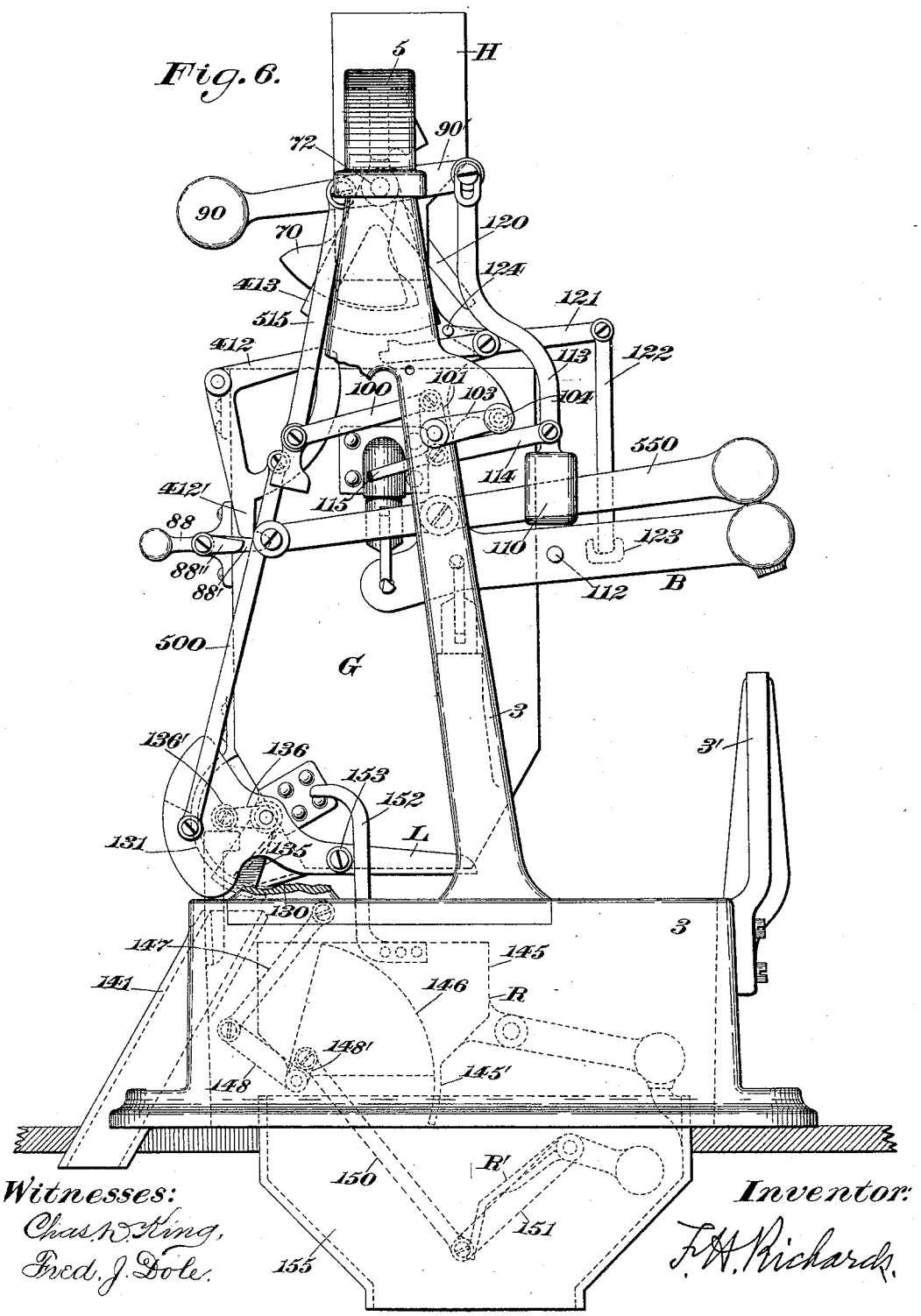
Figure 7:
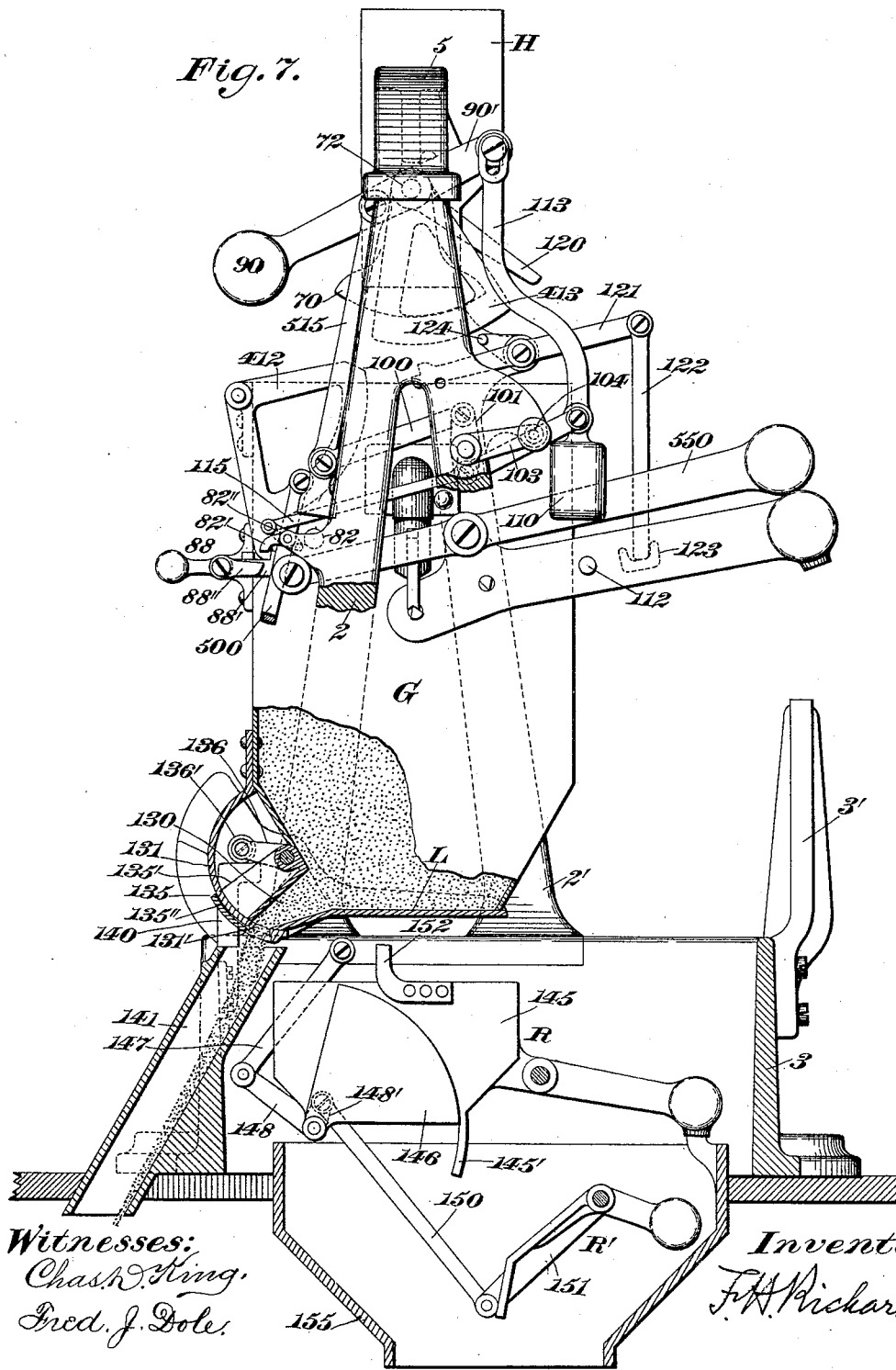
Figure 8:
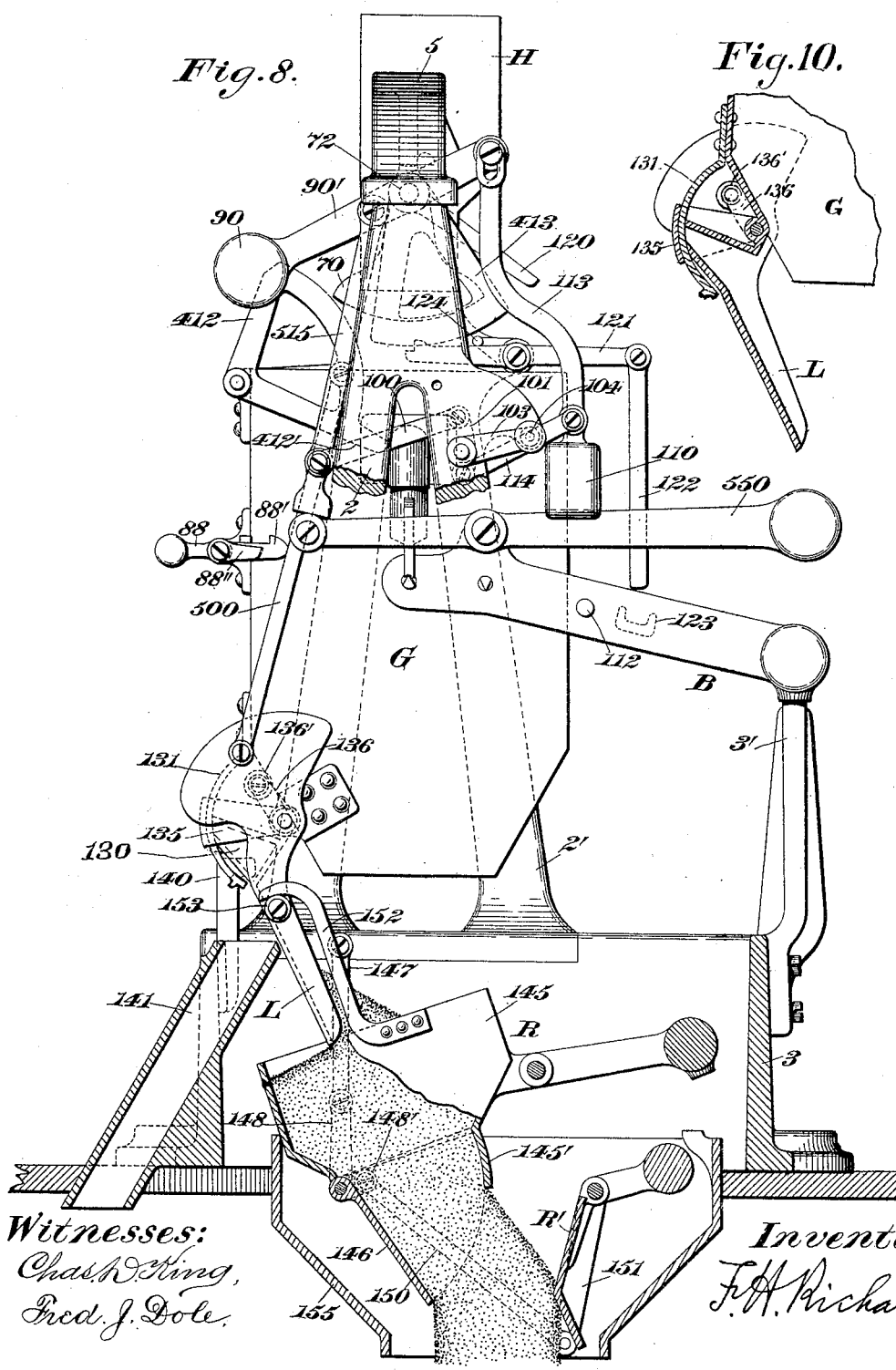
Figure 9:
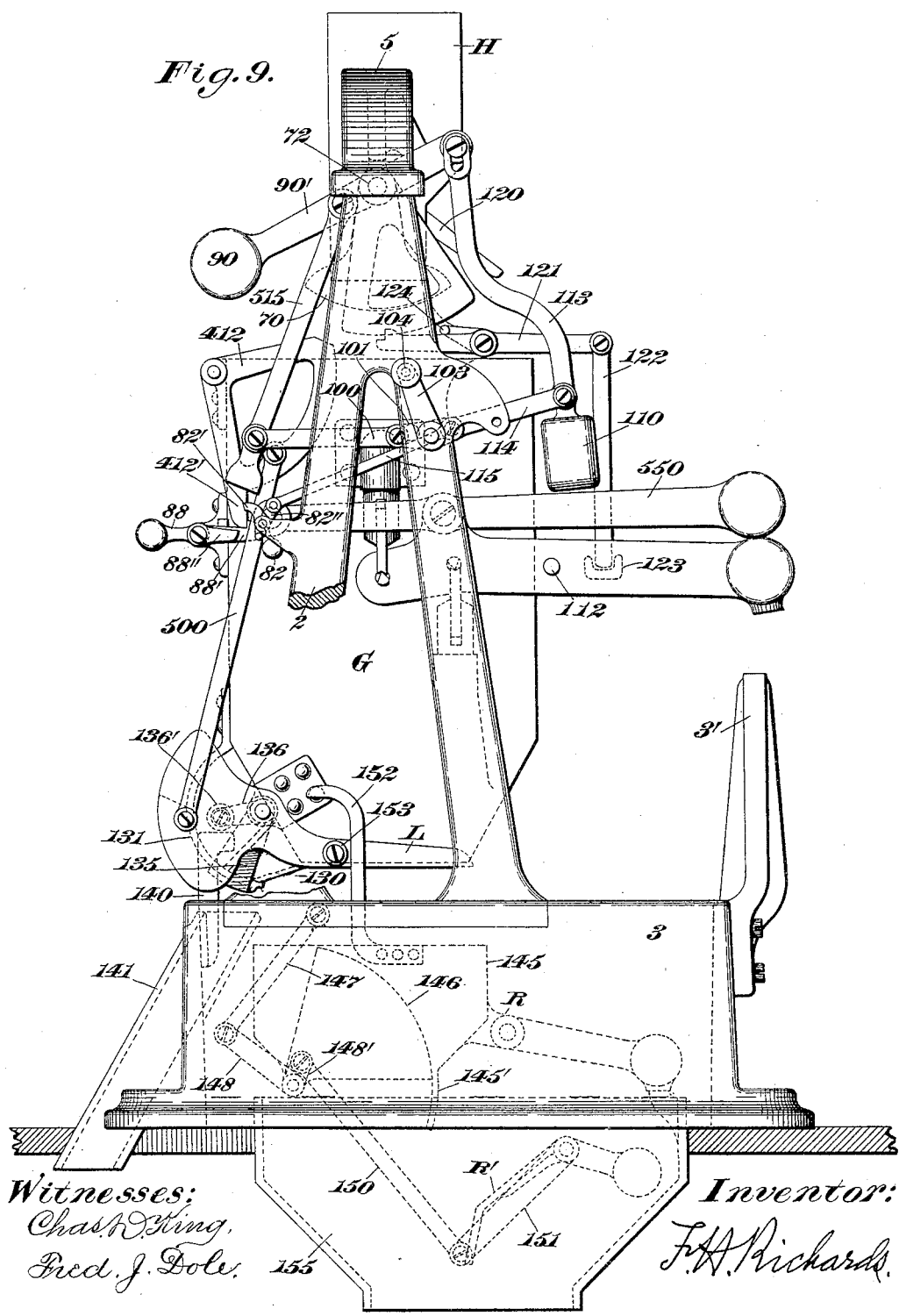

In the drawings accompanying and forming part of this specification, Figure 1 is a sectional rear elevation of an automatic weighing-machine embodying my present improvements. Fig. 2 is a sectional side elevation of the same, showing the parts in their normal positions. Fig. 3 is a detail of a valve controlling the outer end of the load-reducing spout on the load-discharger. Fig. 4 is a horizontal sectional plan of a segment of the machine included between the lines *a a* and *b b*, shown in Figs. 1 and 2. Fig. 5 is a detail side elevation of the upper part of the machine, showing the connections between the valve and the resistance device or overweight and the thrust-rod for opening the valve, all of which will be described hereinafter in detail. Figs. 6, 7, and 8 are side elevations of the machine with parts broken away and illustrate successive steps in the operation of the apparatus between the closing of the valve and the discharge of the load. Fig. 9 is a similar view showing the resistance device or overweight, the valve-opening thrust-rod, and the latch-tripper thrown out of action by the shifting testing device with which they are connected. Fig. 10 is a sectional detail illustrating the construction of the closer, the parts being in the positions illustrated in Fig. 8.

Similar characters designate like parts in all the figures of the drawings.

Any suitable framework may be employed for carrying the several operative parts of my improved weighing-machine. That shown herein comprises as its essential features a pair of side frames 2 and 2', rising from a chambered supporting-base 3 and connected at their upper ends by the usual top beam or cross-beam 5, carrying a hopper or stream-supplying device H.

Any suitable means may be employed for controlling the supply of the material from the hopper H to the load-receiver of the weighing mechanism; but in this case I have shown for this purpose a valve 70, substantially similar in construction and operation to the pan-valves shown in prior patents granted to me. This valve is carried by a shaft 72, mounted in the usual manner in bearings on the top beam 5 and the hopper H, (see Fig. 1,) and is adapted to be closed by means of a valve-closing actuator or counterweight 90, moving in unison therewith and carried by an arm 90' in fixed relation with the shaft 72.

The load-receiver of the weighing mechanism is designated herein by G, and may be substantially similar in most respects to those in common use, and will be pivotally supported on the usual knife-edge pivots of beam mechanism, (designated in a general way by B,) which beam mechanism will be similarly mounted on pivots carried by V-shaped bearings rising from brackets on the side frames. The normal movements of the beam mechanism will be limited in the usual manner by means of a fixed stop formed in this case by a bracket 3', rising from and bolted to the base of the machine.

The opening movement of the valve 70 may be effected in any desired manner, but preferably by means of a valve-opening actuator in the form of a counterweighted lever 550, pivoted on the beam mechanism and adapted to transmit its movement to a valve-opening thrust-rod 515, connected with the valve at one of its ends and normally in position to be operated by said counterweighted lever. This actuator is also secured by suitable connecting means—as, for instance, a link 100— with one end of a crank-arm 101, secured to a pin 102, journaled in a suitable bearing in the side frame 2 and carrying at its outer end an operating member or crank 103, which is movable between two extreme positions, in which it will be held by means of a suitable lock-bolt 104, (see Fig. 4,) adapted to enter openings in the framework in the usual manner.

As it has been found in practice that in delivering an overload to the load-receiver of the weighing mechanism the load-receiver ordinarily will not descend to the proper point without a slight addition to the proper counterweight for the load to be weighed, some suitable resistance, preferably in the form of a counterweight, should be added to the counterpoising side of the weighing mechanism before the overload is delivered to the receiver and subsequently shifted off from said counterpoising side as soon as all of the stream shall have been delivered into the bucket. In the normal positions of the parts this overweight should form part of the counterpoising portion of the beam mechanism, and hence, as illustrated at 110, such a device is normally supported on a stop 112 on the beam. As this overweight is most advantageously shifted at the moment the valve closes and cuts off the supply of material to the load-receiver, I deem it preferable to shift said overweight off from the beam mechanism at the moment of the cut-off of the stream. For this reason suitable connections are illustrated herein between the valve and the overweight for lifting the latter bodily off from the beam at the moment the valve closes, a link being shown at 113 from which the overweight is hung, this link having a loose connection at its upper end with the free end of the arm 90', which forms part of the valve-closing actuator.

For the purpose of guiding the overweight in its movements and also in order to permit said overweight to be lifted off from the beam mechanism by the testing device whenever it is desired to test the operation of the weighing mechanism I have also shown at 114 a guide-link connecting the overweight with the opposite end of the crank-arm 101 from that with which the link 100 is connected.

It will be clear from this description that when it is desired to test the machine the crank 103 may be shifted from the position shown in Fig. 2 to that illustrated in Fig. 9, thus lifting the overweight off from the beam mechanism in the same manner as it would be lifted when operated by the valve-closing actuator.

In the machine illustrated in the drawings of this application the overload is intended to be reduced to a true load by a single operation by the removal of all of the surplus from the receiver on the rising of the latter to a true poise after having been carried to the limit of its downward movement. Hence the latch-tripper, by means of which the latch is released that holds the load-discharger in its normal position, should be operative on the ascent of the bucket. The latch which I employ in the present case is designated herein by 88 and has a catch 88' normally in engagement with a detent 412', carried by a rocker or stop-segment 412, mounted for oscillation on the bucket near the upper side thereof, this rocker being in turn connected, by means of a connecting-rod 500, with the shiftable member or load-discharger of the weighing mechanism, this load-discharger being in this instance the closer L. It will be seen from this that the latch does not engage the closer directly, but holds the same in its closed position by reason of its engagement with the stop 412'. The latch 88 also has a releasing-arm 88'', disposed in the path of movement of the latch-tripper, this latch-tripper being in the present case in the form of a by-pass device mounted on the framework.

The latch-tripper is designated in a general way by 82 and comprises two main members, one of which, 82', is counterweighted and constitutes the tripper proper, while the other (indicated by 82'') is in the nature of a stop controlling the position and limiting the operation of the tripper. The tripper proper, 82', is itself in the nature of a by-pass device, and when in its normal position operates as such on the releasing-arm 88'' of the load-receiver. The stop therefor, however, which controls the position of the tripper proper is not fixed, as is ordinarily the case, but is shiftable between two extreme positions, (shown in Figs. 2 and 9, respectively,) in the former of which the tripper 82' is normally in the path of the arm 88'', while in the latter view said tripper is out of the path of the latch-arm and is in an inoperative position. As a means for shifting the latch-tripper to said last-mentioned position, as illustrated herein, I make use of a rod or link 115, connecting the shiftable stop 82'' with that end of the crank-arm 101 to which the link 114 is pivoted.

From the preceding description of the manner in which the valve-opening actuator, the thrust-rod, the overweight, and the latch-tripper are connected with the testing device it will be apparent that the latter is operative for simultaneously shifting said three members of the mechanism from their operative to their inoperative positions, in which the overweight will be off the weighing mechanism, the latch-tripper out of the path of movement of the latch, and the thrust-rod ineffective to carry the valve-opening actuator to its working position. Hence all of these several devices may be controlled and therefore the throwing of the machine into or out of action by a single movement of the operating lever or crank of the shifting testing means.

The operation of the valve and of the load-discharger should, of course, be controlled by means of the usual interlocking stops, one of which is shown at 412, and has been described, and the other of which is carried by the valve, as indicated at 413, and coöperates with the stop 412 in the usual manner.

In order that the valve 70 may be held wide open until all of the material of the overload shall have been delivered into the receiver, I have illustrated at 120 a stop-lever movable in unison with the valve and adapted to be engaged at its lower end by a detent or valve-latch in the form of a lever 121, supported on the framework and having pivotally connected to its outer end a depending arm 122, the lower end of which is adapted to be received by a stop 123 on the beam and operated thereby. This detent or valve-latch 121 may be held in its normal position by means of a stop, such as that shown at 124. From the organization of these parts with respect to each other and to the overweight it will be seen that the latter and its connecting-link 113 may rise with the beam as the receiver descends and before the valve-opening actuator 90 is released.

As stated in the preceding description, the invention illustrated in the drawings of this application is intended to operate as an overloading weighing-machine, and hence some means must be employed for reducing the overload supplied by the valve to the load-receiver to a true load before the charge is delivered through the base of the machine, and in this instance I make use of improved means for effecting such reduction of the load.

One of the main features of this portion of my invention is the employment, in connection with the shiftable member or load-discharger L of the weighing mechanism, of a load-reducing spout normally open at both ends and carried by the load-discharger, this spout being so positioned as to reduce the overload by discharging material from its outer end when the load-discharger is shut, while when said load-discharger is opened this spout will be shifted in such a manner that it will discharge its contents from its inner end into the main portion of the completed load. This spout is designated herein by 130 and is oscillatory with and is located at one side of the axis of movement of the load-discharger.

In connection with the load-discharger L, having a load-reducing opening therein, I also make use of means for closing such opening, said means serving to control the flow of material from such load-reducing opening and coöperating in this case with the outer end of the spout 130. The means which I prefer to make use of for this purpose is a curved fixed cut-off plate 131, secured to the load-receiver, the inner face of the plate being defined by an arc struck from the axis of oscillation of the closer and having an opening 131' therein normally registering with the opening at the outer end of the spout 130, which spout preferably has its face properly curved to coöperate with the cut-off plate. I also employ, in connection with said plate, a valve carried by the load-discharger and oscillatory about an axis coincident with that of the latter. This valve, which is designated in a general way by 135, is shown clearly in Fig. 3 and is pivotally supported at the rear of the receiver, (see Fig. 1,) with its axis coincident with that of the discharger, said valve comprising a pair of arms or end pieces 135' and a curved plate 135''. When in its normal position, (shown in Fig. 2,) the load-reducing valve 135 closes the opening in the cut-off plate 131 and also the outer end of the spout 130, so as to prevent egress of material; but when the weighing mechanism is carried down by an overload in the receiver to the proper point this valve will be shifted by suitable actuating means to uncover said openings. The actuator which I prefer to employ is in the nature of a fixed member, such as the arm 140, rising from the base 3 of the machine, this arm coöperating in the present case with an arm 136, projecting from the valve and preferably carrying an antifriction-roll 136'. By the engagement of this roll with the fixed arm 140 at the proper point the valve is shifted, as shown in Fig. 7, and the surplus material is delivered from the machine—as, for instance, into the discharge-conduit 141.

In connection with the stream-controlling and weighing mechanisms hereinbefore described I make use of improved regulator apparatus embodying as its essential features two separately-counterweighted regulators located at successive separated points in the path of flow of the load discharged from the receiver and preferably independently supported, though connected so that one will be dependent upon the other for its return to a normal position. These two regulators are designated in a general way by R and R', respectively, the former or main regulator being in the form of a regulator-hopper pivotally supported in the usual manner on the base of the machine. The hopper of this regulator is designated by 145 and has a valve 146 pivoted thereon in such a manner as to control the discharge-outlet therefrom. This valve, in addition to being pivotally mounted on the hopper, has a toggle connection with the framework or base of the machine, said toggle comprising in this instance a link or rod 147, pivoted to the base 3, and an angle-lever in fixed relation with the valve, the long arm 148 of said lever being pivoted to the lower end of the link 147, while the short arm 148' is pivotally connected to the upper end of a connecting-rod 150, which is in turn connected at its opposite end with a rock-arm 151, movable in unison with the regulator R'. The hopper 145 has depending therefrom a guard-plate 145', the inner face of which is defined by an arc struck from the axis of oscillation of the valve 146 in order that said guard-plate may coöperate with the valve.

The second regulator R' may be of any suitable construction and will be pivotally supported—as, for instance, within a fixed discharge-hopper 155, secured to the base of the machine. This second regulator is disposed below the regulator-hopper and is counterweighted in the usual manner. Obviously it will operate to retard the return of the regulator-hopper to its normal position until all of the material of the discharged load shall have passed by it, whereupon it will be effective to oscillate the angle-lever 148 and strike the toggle, thus permitting the regulator-hopper to rise.

The regulator-hopper R also carries thereon a fixed arm in the nature of a hook 152, adapted to engage a stop or pin 153 on the closer and hold the latter open until the return of said regulator-hopper to its normal position, thus preventing the return of the closer to its normal position and consequent opening of the valve until all of the material of the discharged load shall have passed out of the machine.

The operation of an automatic weighing-machine constructed in accordance with my present improvements is as follows: With the parts in their normal positions (shown in Fig. 2) a stream of material will be delivered from the hopper H through the valve 70 into the receiver G until there is an overload in the latter. As soon as the bucket descends below the poising-line the arm 122 is struck by the stop 123 on the beam and the arm 120 is released by the latch 121, whereupon the valve-closing actuator 90 becomes effective to close the valve and cut off the flow of material to the receiver, as shown in Fig. 6. At the same time the resistance device or overweight 110 is lifted off from the stop 112 on the beam mechanism, and hence this overweight is removed from the counterpoising side of the beam mechanism. At the same time, also, the stop 413 is withdrawn from engagement with the stop 412, leaving the latter free to move on the tripping of the latch. As soon as the load-receiver passes below the poising-line the antifriction-roll 136' on the arm 136 of the load-reducing valve 135 strikes the fixed actuator 140 on the framework and said valve is shifted, as shown in Fig. 7, to uncover the outer end of the spout 130 and the opening in the cut-off plate 131, thereby permitting the excess of material in the receiver to flow out into the drip-conduit 141. On the discharge of the surplus material the load-receiver of course rises again, and the reducing-valve 135 will assume its normal position and close the registering openings in the cut-off plate and the spout 130. When the releasing-arm 88" of the latch 88 strikes the latch-tripper in its ascent, the latch will be released and the load-discharger will open, as shown in Fig. 8, to discharge the load from the receiver. At the same time the spout 130, swinging with the closer, will have its outer end closed by the cut-off plate 131 and will be shifted into position to discharge its contents with the main load. By this release of the load-discharger the stop 412 is also carried into position to block the opening movement of the valve. When the material of the load is discharged into the regulator-hopper, the latter, of course, is immediately carried to the position shown in Fig. 8, and the arm 152 engages the stop 153 on the closer to hold the latter positively open. The shifting of the regulator-hopper to the position shown in Fig. 8 also causes the straightening of the toggle connection with the framework, as the valve 146 will of course open as soon as the material enters the hopper. Moreover, the second regulator R' will also be shifted to its working position by the combined action of the stream and the opening of the valve, and will remain in that position and also hold the valve 146 and prevent the return of the regulator-hopper to its normal position, and hence the return of the closer, until the material of the discharged load shall have passed by it and out through the discharge-hopper 155, whereupon the lower regulator and therewith the regulator-hopper and the closer will return to their normal positions, the stop 412 will be withdrawn from engagement with the stop 413, and the valve-opening actuator 550 will be oscillated from the position shown in Fig. 8 to that illustrated in Fig. 2 to open the valve, whereupon all of the parts will be in position for weighing another load.

Having described my invention, I claim—

1. In an automatic weighing-machine, the combination, with stream-supplying means, of a valve; weighing mechanism; a valve-operated, pendent, resistance device normally supported on the weighing mechanism and automatically shiftable on each closing movement of the valve; and testing shifting means connected with the resistance device and also operative for shifting the latter.

2. In an automatic weighing-machine, the combination, with stream-supplying means, of a valve; beam mechanism; a valve-operated, pendent counterweight normally supported on the counterpoising side of the beam mechanism and automatically shiftable off from said counterpoising side on each closing movement of the valve; and testing shifting means connected with the counterweight and also operative for shifting said counterweight off from the counterpoising side of the beam mechanism.

3. In an automatic weighing-machine, the combination, with stream-supplying means, of a valve; beam mechanism; a load-receiver; a valve-opening actuator; a valve-opening thrust-rod; an automatically-shiftable, pendent counterweight normally supported on the counterpoising side of the beam mechanism; and shifting means connecting the thrust-rod and the counterweight for shifting the former out of operative relation with the valve-opening actuator and for automatically shifting the latter off from the counterpoising side of the beam mechanism.

4. In an automatic weighing-machine, the combination, with stream-supplying means, of a valve; beam mechanism; a load-receiver; a valve-opening actuator; a valve-opening thrust-rod; a valve-operated, pendent counterweight normally supported on the counterpoising side of the beam mechanism and automatically shiftable off from said counterpoising side on each closing movement of the valve; and testing shifting means connecting the thrust-rod and the counterweight for shifting the former out of operative relation with the valve-opening actuator and for also shifting the counterweight off from the counterpoising side of the beam mechanism.

5. In an automatic weighing-machine, the combination, with stream-supplying means, of a valve; weighing mechanism embodying a member shiftable for discharging a load; a latch for said shiftable member; a latch-tripper; an automatically-shiftable, pendent resistance device normally supported on the weighing mechanism; and shifting means connecting the latch-tripper and the resistance device for shifting the former out of operative relation with the latch and for also automatically shifting the resistance device.

6. In an automatic weighing-machine, the combination, with stream-supplying means, of a valve; beam mechanism; a load-receiver; a load-discharger; a valve-opening actuator; a valve-opening thrust-rod; a latch for the load-discharger; a latch-tripper; an automatically-shiftable, pendent resistance device normally supported on the weighing mechanism; and shifting means connecting the latch-tripper, the thrust-rod, and the resistance device for shifting the latch-tripper and the thrust-rod out of operative relation with the latch and the valve-opening actuator, respectively, and for also automatically shifting the resistance device.

7. In an automatic weighing-machine, the combination, with framework and with stream-supplying means, of a valve; beam mechanism; a load-receiver; a load-discharger; a valve-opening actuator; a valve-opening thrust-rod; a latch for the load-discharger; a latch-tripper; a valve-operated counterweight normally carried on the counterpoising side of the beam mechanism and automatically shiftable off from the said counterpoising side on each closing movement of the valve; a crank on the framework; a crank-arm for operating said crank; and links connecting said crank-arm with the latch-tripper, the thrust-rod, and the counterweight, for shifting the latch-tripper and the thrust-rod out of operative relation with the latch and the valve-opening actuator, respectively, and for also automatically shifting the counterweight off from said counterpoising side of the beam mechanism.

8. In an automatic weighing-machine, the combination, with overloading means, of weighing mechanism embodying a member shiftable for discharging a load; and a load-reducing spout carried by said load-discharger and shiftable therewith into position to discharge material from its opposite ends alternately.

9. In an automatic weighing-machine, the combination, with overloading means, of weighing mechanism embodying an oscillatory member shiftable for discharging a load; and a load-reducing spout carried by said load-discharger and shiftable therewith into position to discharge material from its opposite ends alternately.

10. In an automatic weighing-machine, the combination, with overloading means, of weighing mechanism embodying an oscillatory member shiftable for discharging a load; and a load-reducing spout carried by said load-discharger at one side of the axis of oscillation of the latter and shiftable therewith into position to discharge material from its opposite ends alternately.

11. In an automatic weighing-machine, the combination, with overloading means, of weighing mechanism embodying a member shiftable for discharging a load; and a load-reducing spout carried by said load-discharger and normally in position to discharge material from its outer end to reduce the load, and shiftable with said load-discharger into position to discharge its contents from its inner end with the main load.

12. In an automatic weighing-machine, the combination, with overloading means, of weighing mechanism embodying a member shiftable for discharging a load and having a load-reducing opening; and means for closing said opening.

13. In an automatic weighing-machine, the combination, with overloading means, of weighing mechanism embodying a member shiftable for discharging a load and having a load-reducing opening; and a valve carried by the weighing mechanism for closing said opening.

14. In an automatic weighing-machine, the combination, with overloading means, of weighing mechanism embodying an oscillatory member shiftable for discharging a load and having a load-reducing opening; and an oscillatory valve having its axis of movement coincident with that of said oscillatory member and controlling said load-reducing opening.

15. In an automatic weighing-machine, the combination, with overloading means, of a load-receiver; an oscillatory load-discharger having a load-reducing opening; a curved fixed cut-off plate carried by the load-receiver and having an opening normally registering with that in the load-discharger; and an oscillatory valve having its axis of movement coincident with that of said load-discharger and controlling the opening in the cut-off plate.

16. In an automatic weighing-machine, the combination, with overloading means, of weighing mechanism embodying a member shiftable for discharging a load and having a load-reducing opening; a shiftable valve carried by the weighing mechanism for closing said opening; and valve-actuating means operative on the overpoising of the weighing mechanism for shifting said valve to uncover said load-reducing opening.

17. In an automatic weighing-machine, the combination, with framework and with overloading means, of weighing mechanism embodying a member shiftable for discharging a load and having a load-reducing opening; a shiftable valve carried by the weighing mechanism for closing said opening; and a fixed valve-actuator on the framework in position and adapted for shifting said valve for uncovering said load-reducing opening on the overpoising of the weighing mechanism.

18. In an automatic weighing-machine, the combination, with stream-controlling means and with mechanism embodying a load-receiver, of a pair of regulators disposed at successive points in the path of a discharged load and one adapted to receive material from the other, said regulators having different periods of operation and also having separate and separately-effective counterpoising members.

19. In an automatic weighing-machine, the combination, with stream-controlling means and with weighing mechanism embodying a load-receiver, of a pair of independently-supported regulators disposed at successive points in the path of a discharged load and one adapted to receive material from the other, said regulators having different periods of operation and also having independently-oscillatory and separately-effective counterweights.

20. In an automatic weighing-machine, the combination, with stream-controlling means and with weighing mechanism embodying a load-receiver, of a pair of regulators disposed at successive points in the path of a discharged load and one adapted to receive material from the other, said regulators having different periods of operation and also having independently-oscillatory and separately-effective counterweights; and connecting means between said regulators.

21. In an automatic weighing-machine, the combination, with framework and with stream-controlling means, of weighing mechanism embodying a load-receiver; a counterweighted regulator-hopper; a valve supported on, and normally closing, the discharge end of said hopper; a toggle connection between the framework and the valve and fixed to the latter; a second counterweighted regulator below said regulator-hopper; and connecting means between the second regulator and the valve of the regulator-hopper.

FRANCIS H. RICHARDS.

Witnesses:
F. N. CHASE,
ANDREW FERGUSON.